June 9, 1942.                V. A. HOOVER                2,285,436
                    MOTOR AND COOLING MEANS THEREFOR
                         Filed July 30, 1940
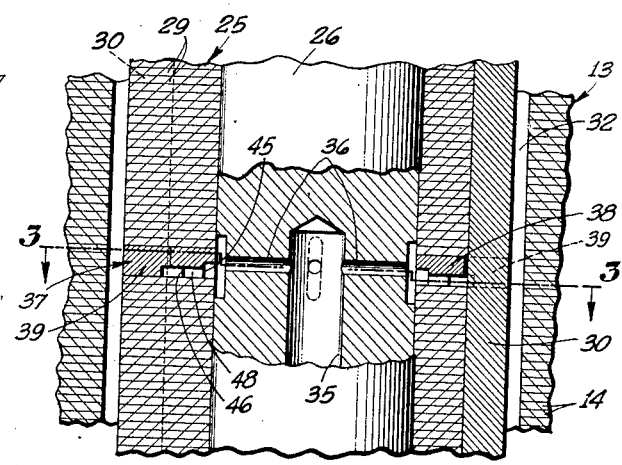
Fig. 2.
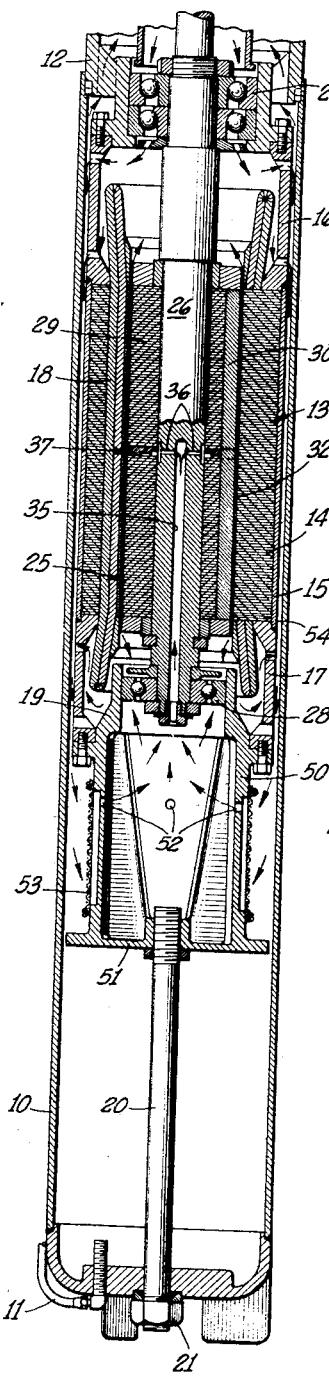
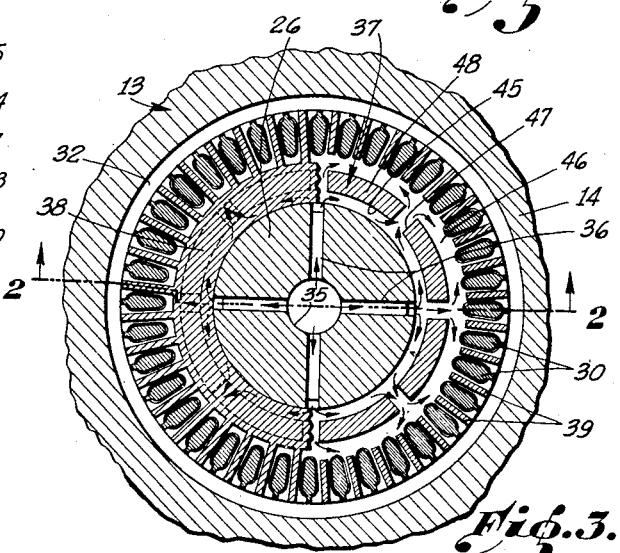
Fig. 3.
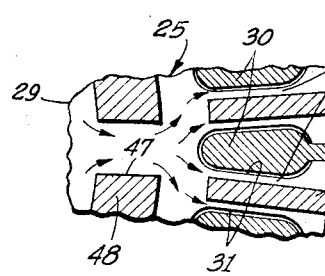
Fig. 4.
Fig. 1.
VAINO A. HOOVER,
INVENTOR
BY John D. Chesnut
ATTORNEY Patented June 9, 1942

2,285,436

UNITED STATES PATENT OFFICE 2,285,436

MOTOR AND COOLING MEANS THEREFOR

Vaino A. Hoover, Los Angeles, Calif., assignor to Byron Jackson Co., Huntington Park, Calif., a corporation of Delaware Application July 30, 1940, Serial No. 348,393

7 Claims. (Cl. 172—36)

This invention relates generally to electric motors, and particularly to motors of the type in which the motor housing is filled with a dielectric liquid, and the invention has as its principal object the provision of novel and improved means for cooling the motor by the circulation of dielectric liquid through the rotor gap.

A further object of the invention is to provide a motor construction including a rotor having a novel and improved pumping element incorporated therein for discharging cooling liquid into the rotor gap intermediate the ends thereof whereby the heat generated during operation of the motor is rapidly carried away to a zone where it may be dissipated through the motor housing into the surrounding medium.

A still further object is to provide a novel pumping element adapted to be incorporated in a rotor of the type embodying stacked laminations and circumferentially spaced rotor bars extending lengthwise of the laminations, and in which the pumping element is inserted between two adjacent laminations and adequately supports the same against axial compressive forces.

The manner in which the above and other objects are accomplished will be apparent from the following detailed description of a preferred embodiment of the invention, reference being had to the accompanying drawing wherein:

Fig. 1 is a longitudinal sectional view of a motor embodying the novel cooling means;

Fig. 2 is an enlarged fragmentary view of the central portion of the motor of Fig. 1, taken on the broken section indicated by line 2—2 of Fig. 3;

Fig. 3 is a transverse section taken on line 3—3 of Fig. 2; and

Fig. 4 is an enlarged fragmentary view of a portion of Fig. 3.

For purpose of illustration, the invention has been shown as applied to an electric motor of the submersible type such as that shown in U. S. Patent No. 2,171,749, dated September 5, 1939, to A. Hollander and V. A. Hoover, for Submersible motor assembly, in which the operative parts of the motor are enclosed in a housing 10 adapted to be filled with a liquid of high dielectric strength. The housing is shown as closed at its lower end except for a filler line 11 through which dielectric liquid may be added to or drained from the housing. In practice, a high grade of oil is generally used as the dielectric liquid, and hence for convenience the term "oil" will be used to designate the dielectric liquid, although it will be understood that the scope of the invention is not thereby restricted to oil-filled motors.

In the illustrated embodiment, the construction of the motor is in all essential respects similar to that shown in the aforementioned patent. The housing 10 is secured at its upper end in fluid-tight relation to an upper bearing bracket 12 which may enclose a shaft seal or other packing means for the rotor shaft, as shown in the above-mentioned patent. The stator of the motor is indicated generally at 13, and comprises an annular core 14 consisting of a series of stacked laminations enclosed in a shell 15 and secured in compact relation by end bells 16 and 17 welded to opposite ends of the shell 15. As is customary in motors of this type, the motor windings 18 extend through suitable slots in the stator laminations. A lower bearing bracket 19 is detachably secured to the lower end bell 17, and at its lower end has threaded engagement with an elongated bolt 20 extending through an opening in the lower end of the housing 10 and having a nut 21 at its lower end for securing the housing in assembled relation to the motor frame.

A rotor, generally designated 25, is mounted in the bore of the stator, and comprises a shaft 26 rotatably mounted in the upper and lower bearing brackets 12 and 19 by suitable anti-friction bearings 27 and 28, and a laminated core 29 surrounding the shaft in the region of the stator core 14. As shown most clearly in Figs. 3 and 4, a plurality of circumferentially spaced rotor bars 30 of copper or other suitable electric current conducting material extend lengthwise of the rotor through slots 31 adjacent the outer periphery of the laminations. The outer diameter of the laminations is only slightly smaller than the bore in the stator, providing close running clearance between these elements. In the drawing the width of the gap 32 between the rotor and the stator has been exaggerated for purpose of illustration, but it will understood that in actual practice this gap is ordinarily of the order of only a few hundredths of an inch.

During the operation of an induction motor a considerable amount of heat is continuously developed in the rotor and stator cores, and unless this heat is dissipated in some manner the motor will run hot and damage may ensue. In submersible motors of the type described in the aforementioned Patent No. 2,171,749, the motor housing is immersed in an ambient liquid and, in cases where the motor is employed to drive a deepwell pump, the well liquid is caused to flow over the outer surface of the motor housing and thus dissipate such heat as is transferred from the rotor and stator cores to the motor housing. In the particular motor construction disclosed in that patent, the stator shell is spaced inwardly of the motor housing to provide an annular channel through which the motor oil may circulate in contact with the inner wall of the housing and thus be cooled. The circulation in this channel is obviously downwardly, since the cooler oil is heavier and tends to descend and force warmer oil upwardly through the rotor gap. This thermo-siphonic circulation is relatively slow, however, and is inadequate to remove more than a small proportion of the heat generated, the major portion being dissipated outwardly by conduction through the stator core to the stator shell and thence to the oil in the outer channel between the stator and the housing.

The foregoing method of cooling is adequate for motors of moderate horsepower, and the temperature rise in such motors during operation is not sufficient to noticeably lower the life of the insulation. However, with an increase in horsepower and a consequent increase in stator and rotor length for a limited stator diameter, the cooling problem becomes more acute and for horsepower capacities in excess of 100 H. P. the aforementioned cooling system is inadequate to maintain the temperature in the hottest part of the motor at a safe level.

In order to provide more rapid transfer of heat away from the zone of heat generation, I have provided a forced circulation of oil in contact with the surfaces of maximum temperature, thereby removing heat from those surfaces by convection in a rapidly flowing stream of oil. The rate of transfer of heat in this manner is obviously much more rapid than by conduction through the solid bodies of metal of which the stator and rotor cores are constituted. In order to further increase the rate of transfer of heat, a stream of relatively cool oil is introduced directly into the rotor gap at a point approximately midway between the ends thereof and caused to flow from such mid-point in opposite directions toward the ends of the gap. After leaving the gap it is directed into contact with the relatively cool inner wall of the motor housing and cooled before being recirculated through the gap.

Referring to Fig. 1 of the drawing, it will be observed that the rotor shaft 26 is provided with a central bore 35 extending from its lower end to a point substantially midway of the length of the laminated core 29. Adjacent the upper extremity of the bore 35 a plurality of radial passages 36 extend from the central bore to the outer periphery of the shaft. As shown in Fig. 3 there are four such passages arranged substantially at right angles to each other. It will be evident that during rotation of the shaft the oil entering the central bore will be forced radially outwardly through the passages 36. A novel and improved pumping element, generally designated 37, is incorporated in the rotor in the transverse plane of the radial passages 36, and serves to distribute the oil issuing from the passages 36 uniformly about the circumference of the shaft and forces it outwardly through the rotor and into the rotor gap in a multiplicity of small streams at closely spaced points on the periphery of the rotor.

The detailed construction of the pumping element 37 will be understood from a consideration of Figs. 2, 3 and 4 of the drawing. Generally speaking, it consists of a one-piece, annular disk-shaped member comprising a hub portion 38 bored to snugly fit over the shaft 26 and extending outwardly to a point closely adjacent the inner edges of the rotor bars 30, and a plurality of radially extending fins 39 extending from the hub portion to the outer periphery of the rotor. As shown in Figs. 3 and 4, the circumferential spacing of the fins 39 corresponds to that of the rotor bars 30, a fin being interposed between each pair of adjacent bars. The circumferential width of each fin is slightly less than the width of the space between the rotor bars, thereby providing a narrow radially extending oil passage 40 between each fin and the adjacent rotor bars, as shown most clearly in Fig. 4.

The streams of oil issuing from the radial passages 36 in the shaft are further divided and distributed to the inner ends of the passages 40 by a series of circumferential channels and radial passages formed in the lower portion of the hub 38 of the pumping element. An inner channel 45 and a similar outer channel 46 extend circumferentially about the shaft and are connected at intervals by passages 47 extending radially through the intervening rib 48 between the channels. As shown in Fig. 2, the channels 45 and 46 extend upwardly from the lower face of the pumping element, a transverse section in the radial plane of the channels being as shown in the right half of Fig. 3. In the upper portion of the pumping element the hub 39 provides a solid member extending from the shaft to the fins 39, as illustrated in the left half of Fig. 3. As indicated by the arrows, a portion of the oil issuing from the passages 36 flows outwardly through aligned passages 47 through the rib 48 and thence is distributed in the outer channel 46 to the passages 40 in the region of each respective passage 47. A portion of the oil also flows circumferentially along the inner channel 45 to intermediate passages 47 and thence into the outer channel and through adjacent passages 40.

By directing the relatively cool oil over a substantial area of the rotor and in contact with each of the rotor bars, a substantial amount of heat is absorbed by the oil before it reaches the rotor gap 32. After entering the gap and while flowing in an axial direction toward the ends of the gap, the oil absorbs additional heat from both the rotor and the stator by direct contact with the surfaces thereof which define the gap. A relatively large amount of heat is thereby removed from the rotor and stator in the stream of oil, and, inasmuch as the rate of heat transfer by this method is much more rapid than by conduction through the stator, the temperature difference between the hottest portion of the motor and the liquid surrounding the motor housing is very materially reduced. The extent of actual reduction of this temperature difference is indicated by the following results of actual tests:

In a 150 H. P. motor, operating submerged in water and not equipped with an oil circulating pump, the temperature of the stator windings rose 67.0° centigrade above the temperature of the surrounding water. In an identical motor operating submerged in water under the same load, but equipped with the oil circulating pump illustrated in the accompanying drawing, the temperature rise in the stator windings above that of the water was only 38.5° centigrade, or practically half that of the former case.

The particular construction of the pumping element 37 embodies another important feature in addition to those mentioned above. It will be observed with reference to Fig. 2 that, with the exception of the circumferential channels 45 and 46 and the radial passages 47, the pumping element is of uniform thickness from the shaft out to the outer periphery of the rotor, providing parallel top and bottom surfaces lying in radial planes. It will also be observed from the left half of Fig. 3 that the upper surface of the pumping element is broken only by the spaces provided for the rotor bars between the fins 39, and that the area of the lower surface is reduced only by the channels 45 and 46 and passages 47. The pumping element thus presents supporting surfaces to the two adjacent rotor laminations between which it is interposed, which surfaces are substantially coextensive with those of the laminations. The importance of this feature will be appreciated when it is realized that the rotor 29 is built up by stacking the laminations on the shaft and then applying a powerful compressive force in an axial direction to compress the laminations into a substantially solid mass, and then applying retaining means at opposite ends of the rotor to retain the laminations in a compressed state. If a pumping element were interposed between certain of the laminations during the stacking operation, and if it failed to provide uniform spacing and adequate support for substantially the entire adjacent surfaces of the laminations between which it is interposed, the laminations would obviously flex under pressure and result in an inferior product.

The pumping element 37 is preferably, although not necessarily, of non-magnetic material such as bronze. It will be understood by those skilled in this art that the shape of the pumping element is such that it would not develop torque proportional to the electrical energy consumed by the eddy currents which would be developed therein if it were constructed of magnetic material, and therefore it is deemed preferable to construct it of non-magnetic material and thereby prevent the formation of eddy currents and the consequent loss of power.

It will be observed from Fig. 1 that the lower bearing bracket 19 is provided with a depending cylindrical extension 50 having a closed lower end 51 and forming an enclosure into which oil is admitted only through ports 52 in the side wall thereof. A filter screen 53, preferably of several layers of closely woven wire mesh or screen cloth, surrounds the cylindrical portion 50 to prevent entrance of foreign matter through the ports 52. It will also be observed that, as previously mentioned, an annular channel 54 is provided between the stator 13 and the inner wall of the housing 10, and that suitable circulation ports are provided through the outer walls of the stator end bells 16 and 17 to permit outward flow of oil from the rotor gap 32 to the channel 54.

The various circulation paths of oil through the rotor gap 32 and through the bearings 27 and 28 are indicated by the arrows in Fig. 1. It will be particularly noted that only clean, relatively cool oil is admitted to the central bore 35 in the rotor shaft, and that the oil discharged from each end of the rotor gap is forced outwardly into contact with the relatively cool inner wall of the motor housing before being circulated through the bearings or re-circulated through the rotor gap. This is accomplished by causing the oil to flow upwardly through the lower bearing 28 and downwardly through the upper bearing, the flow in each instance being in opposition to the streams of oil issuing from the ends of the rotor gap.

From the foregoing detailed description of a preferred embodiment of the invention, it will be apparent that the heat generated in the rotor and stator during operation of the motor is rapidly withdrawn from the zone of heat generation and transferred to the ambient fluid surrounding the motor housing. It will also be apparent that the pumping element is of such a nature that it may be incorporated in a standard rotor without any modification thereof except the substitution of the pumping element in lieu of a few laminations having a combined thickness equal to the thickness of the pumping element.

It is to be understood that the invention is not limited to the precise details of the embodiment illustrated and described herein, but is of the full scope of the appended claims.

I claim:

1. A dynamo-electric machine comprising a stator having a rotor opening; a rotor in said opening and comprising a rotor shaft, a laminated core surrounding said shaft, and circumferentially spaced rotor bars extending longitudinally through said core, said core cooperating with said stator opening in defining a gap; and means for discharging a cooling medium into said gap intermediate the ends thereof, comprising a pumping element clamped between a pair of adjacent laminations of said core, said pumping element including an annular hub portion surrounding said shaft and having a plurality of circumferentially spaced fluid passageways extending radially therethrough and rib portions extending radially between said rotor bars in spaced relation thereto whereby said rib portions and said rotor bars define fluid passageways communicating with the fluid passageways in said hub portion; and conduit means extending from a source of cooling medium to the radially inner ends of said first-named fluid passageways.

2. A dynamo-electric machine as set forth in claim 1, in which said laminated core is subjected to longitudinal compression when assembled, and in which said pumping element includes parallel upper and lower surfaces substantially coextensive in area with said laminations, thereby supporting the adjacent laminations over the major portion of their surfaces against distortion by the application of said longitudinal compressive force.

3. A dynamo-electric machine comprising: a stator having a rotor opening; a rotor in said opening and comprising a rotor shaft, a laminated core surrounding said shaft, and circumferentially spaced rotor bars extending longitudinally through said core adjacent the outer periphery thereof; said shaft including a fluid passageway extending substantially centrally thereof from an end thereof to an intermediate point, and a radial passageway extending from said central passageway to the outer periphery of said shaft; and a pumping element surrounding said shaft and clamped between a pair of adjacent laminations of said core and including a pump passageway extending from said radial passageway to the radially inner edges of said rotor bars, and means on said pumping element cooperating with the radially extending faces of said rotor bars in defining passageways extending radially outwardly past said bars.

4. A dynamo-electric machine comprising: a stator having a rotor opening; a rotor in said opening and cooperating therewith in defining a gap, said rotor comprising a shaft, a laminated core on said shaft, and circumferentially spaced rotor bars extending longitudinally through said core; walls forming a fluid passageway in said shaft; and means for discharging cooling fluid from said passageway to said gap at a section intermediate the ends of the latter, comprising a pump disk interposed between a pair of adjacent core laminations, said disk including a continuous annular hub section having fluid passageways therein and a radially slotted outer section providing circumferentially spaced ribs disposed between said rotor bars, said ribs extending in closely spaced relation to said rotor bars whereby the adjacent walls of said ribs and bars cooperate to form passages for circulation of cooling liquid in heat-exchange relation with said bars.

5. A dynamo-electric machine comprising: a stator having a rotor opening; a rotor in said opening and cooperating therewith to define a gap, said rotor comprising a shaft, a laminated core on said shaft, and circumferentially spaced rotor bars extending longitudinally through said core; walls forming a fluid passageway in said shaft; and means for discharging cooling fluid from said passageway to said gap at a section intermediate the ends of the latter, comprising a pump disk interposed between a pair of adjacent core laminations, said disk including a continuous annular hub section having fluid passageways therein and a radially slotted outer section providing circumferentially spaced ribs disposed between said rotor bars, the fluid passageways in said hub section including an inner circumferential channel communicating with said shaft passageway, an outer circumferential channel communicating with the radial slots in said outer section, and radial channels connecting said inner and outer channels at circumferentially spaced points.

6. A rotor for use in a dynamo-electric machine comprising: a shaft; an axially compressed laminated core on said shaft, the individual laminations of which are of insufficient rigidity to prevent distortion of unsupported portions thereof when subjected to the usual assembly pressure; a pump disk clamped between a pair of adjacent laminations, said pump disk providing oppositely directed parallel faces in supporting engagement with the adjacent laminations over a sufficient area thereof to prevent distortion when subjected to axially directed compressive force.

7. A rotor for use in a dynamo-electric machine comprising: a shaft; a laminated core on said shaft, said core comprising a stacked series of laminations subjected to axial pressure when assembled, each lamination including circumferentially spaced slots opening to the outer periphery thereof, the portions between said slots being of insufficient rigidity to prevent flexing thereof if unsupported while subjected to normal assembly pressure; rotor bars extending longitudinally through the aligned slots in said laminations; and a pump disk clamped between a pair of adjacent laminations and including an annular hub portion having opposite radial faces in supporting engagement with the main body portion of the adjacent laminations, and radially extending ribs projecting between said rotor bars and having radial faces coextensive with the radial faces on said hub portion and having supporting engagement with the portions of said adjacent laminations lying between said rotor bars, whereby flexing of said last named portions when subjected to assembly pressure is prevented.

VAINO A. HOOVER.